(12) United States Patent  (10) Patent No.: US 8,801,065 B1
Jones  (45) Date of Patent: Aug. 12, 2014

(54) CARRYING DEVICE FOR AN ELECTRONIC DEVICE

(71) Applicant: David Jones, Laguna Niguel, CA (US)

(72) Inventor: David Jones, Laguna Niguel, CA (US)

( * ) Notice: Subject to any disclaimer, the term of this patent is extended or adjusted under 35 U.S.C. 154(b) by 0 days.

(21) Appl. No.: 14/090,054

(22) Filed: Nov. 26, 2013

Related U.S. Application Data

(60) Provisional application No. 61/730,262, filed on Nov. 27, 2012.

(51) Int. Cl.
*A45F 5/00* (2006.01)
*H05K 5/02* (2006.01)
*A45F 5/10* (2006.01)

(52) U.S. Cl.
CPC . *H05K 5/023* (2013.01); *A45F 5/10* (2013.01)
USPC ............................... 294/165; 294/25; 16/430

(58) Field of Classification Search
USPC ........... 294/16, 25, 99.1, 99.2, 137, 165, 212, 294/902; 16/110.1, 422, 430, 431, 443, 16/DIG. 24; 24/304, 457, 545
See application file for complete search history.

(56) References Cited

U.S. PATENT DOCUMENTS

| 2,846,134 | A | | 8/1958 | Moubayed |
| 3,990,655 | A | * | 11/1976 | Covell ........................ 294/147 |
| 6,375,239 | B1 | | 4/2002 | Reed et al. |
| 6,955,280 | B2 | * | 10/2005 | Saitoh et al. .................. 224/269 |
| 7,455,339 | B2 | | 11/2008 | Staples |
| 7,921,525 | B1 | * | 4/2011 | Lucas ............................. 24/306 |
| 8,622,447 | B1 | * | 1/2014 | Wirtz .............................. 294/25 |
| 2005/0244213 | A1 | * | 11/2005 | Carmen et al. .................. 402/19 |
| 2011/0289739 | A1 | * | 12/2011 | Diehl .............................. 24/457 |

* cited by examiner

*Primary Examiner* — Stephen Vu
(74) *Attorney, Agent, or Firm* — Crossley Patent Law; Micah C. Gunn

(57) ABSTRACT

A carrying device for an electronic device including a unitary body having a handle and a base, the handle having a centrally disposed aperture and a concave opening in each of the right and left sides of the handle to receive a user's fingers therethrough is provided. A pivotable first flange and an identical second flange are disposed on a base, each flange having a folding score line to allow the device to pivot from a first position to a second position when in use with a laptop. Each flange has an adhesive inner wall to attach the carrying device to an electronic device. A channel, configured to receive an outer edge of an electronic device, is disposed between the first and second flanges to permit a user to transport an electronic device without the need for a satchel or carrying case.

9 Claims, 4 Drawing Sheets

CARRYING DEVICE FOR AN ELECTRONIC DEVICE

CROSS-REFERENCE TO RELATED APPLICATIONS

Figure 1:
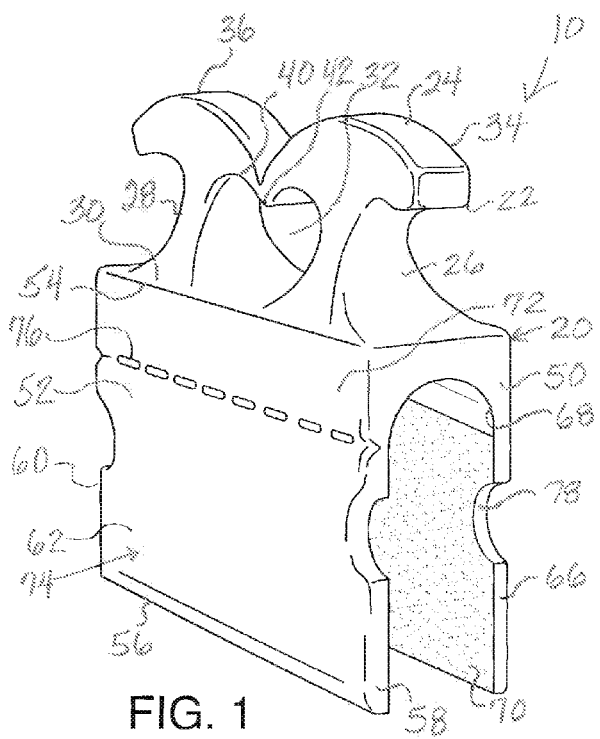

U.S. Provisional Application No. 61,730,262 Filed Nov. 27, 2012

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of carriers are known in the prior art. However, what is needed is a carrying device for an electronic device that will easily and conveniently allow a user to safely carry an electronic device without the need for a satchel or other type of carrying case. In this age of technology, electronic devices such as Ipads, tablets, laptops and televisions are used on a daily basis to perform many tasks. Often, a user must transport the electronic device to various locations throughout the day. Currently, if a user does not wish to use a carrying case to transport an electronic device, then he must carry the electronic device by awkwardly grasping the edges of the electronic device, support the electronic device under his arm in the same manner as if carrying a book under his arm, or support the electronic device on his palms similar to the manner in which a pizza box is carried and these means of transport can increase the chance of dropping, damaging, and destroying the electronic device. The present carrying device fulfills a need for an easy, convenient way to grasp and securely transport most electronic devices. Multiple carrying devices for an electronic device can be used on multiple sides of an electronic device to provide optional means of transporting larger electronic devices.

FIELD OF THE INVENTION

The present invention relates to carriers, and more particularly, to a carrying device for an electronic device.

SUMMARY OF THE INVENTION

The general purpose of the present carrying device for an electronic device, described subsequently in greater detail, is to provide a carrying device for an electronic device which has many novel features that result in a carrying device for an electronic device which is not anticipated, rendered obvious, suggested, or even implied by prior art, either alone or in combination thereof.

To accomplish this, the present carrying device for an electronic device includes a unitary body with an ergonomic handle having an aperture centrally disposed therein configured to receive at least one of a user's fingers therethrough. A base disposed on a bottom side of the handle has a first flange and an identical second flange. A channel, configured to releasably receive an outer edge of an electronic device, is continuously disposed between an inner wall of each of the first and second flanges. A fastener member, configured to adhere to the front side and the back side of the electronic device proximal the outer edge secured within the channel, is disposed on the inner wall of each of the first and second flanges. Each of the first and second flanges has an upper portion and a lower portion pivotably attached to the upper portion with a folding score line continuously disposed therebetween to permit at least one of the lower portions to move from a first position, in which the first and second flanges are parallel to each other, to a second position in which the flanges are perpendicular to each other. This permits the user to open a laptop computer while the carrying device is still connected to the laptop.

A concave notch, disposed on each of the right and left edge of each lower portion, prevents any cameras, speakers or buttons from being covered while the carrying device is being used with an Ipad. Multiple carrying devices can be used on a single electronic device as the user deems necessary.

The present carrying device will be made of a rigid material such as plastic, but can be made from any suitable material, even flexible material such as canvas. The fastener member can be one of a hook and loop fastener, an adhesive, a non-slip gripping substance, and a snap assembly.

Thus has been broadly outlined the more important features of the present carrying device for an electronic device so that the detailed description thereof that follows may be better understood and in order that the present contribution to the art may be better appreciated.

BRIEF DESCRIPTION OF THE DRAWINGS FIGURES

Figure 2:
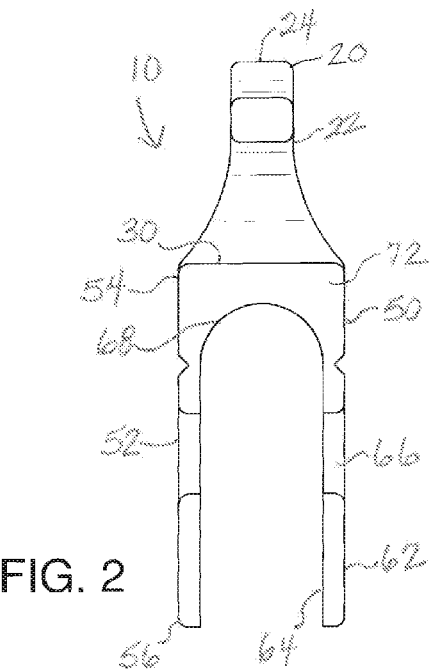
Figure 3:
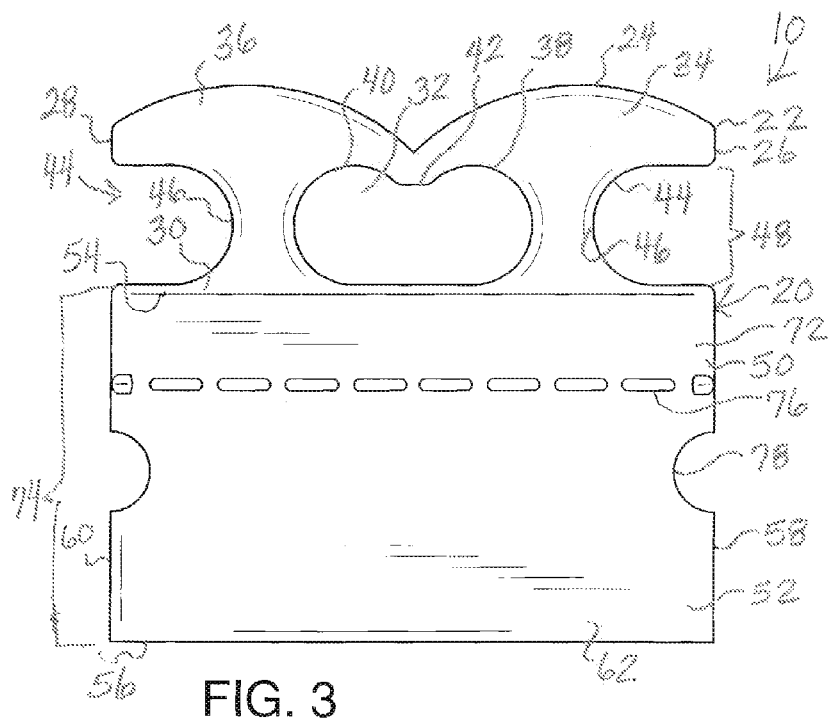
Figure 4:
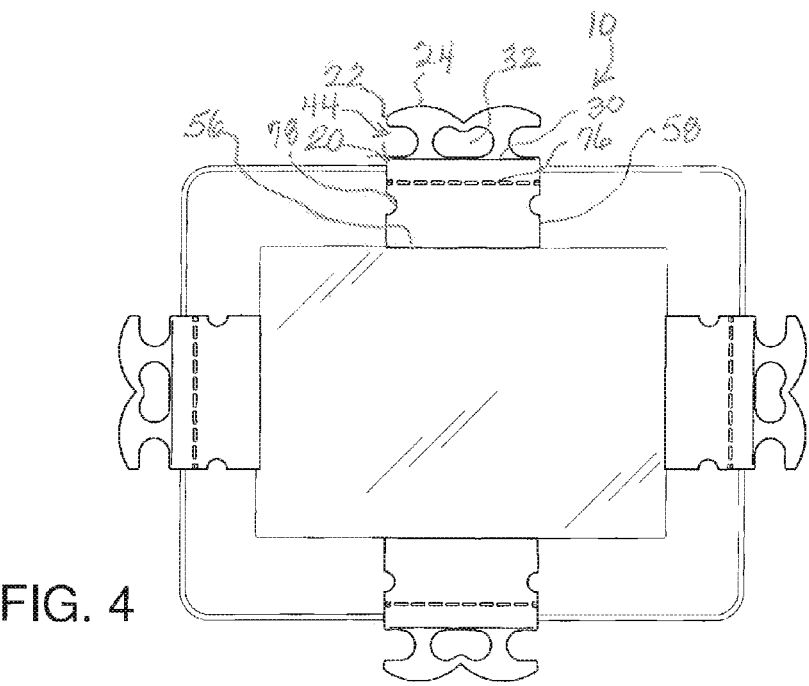
Figure 5:
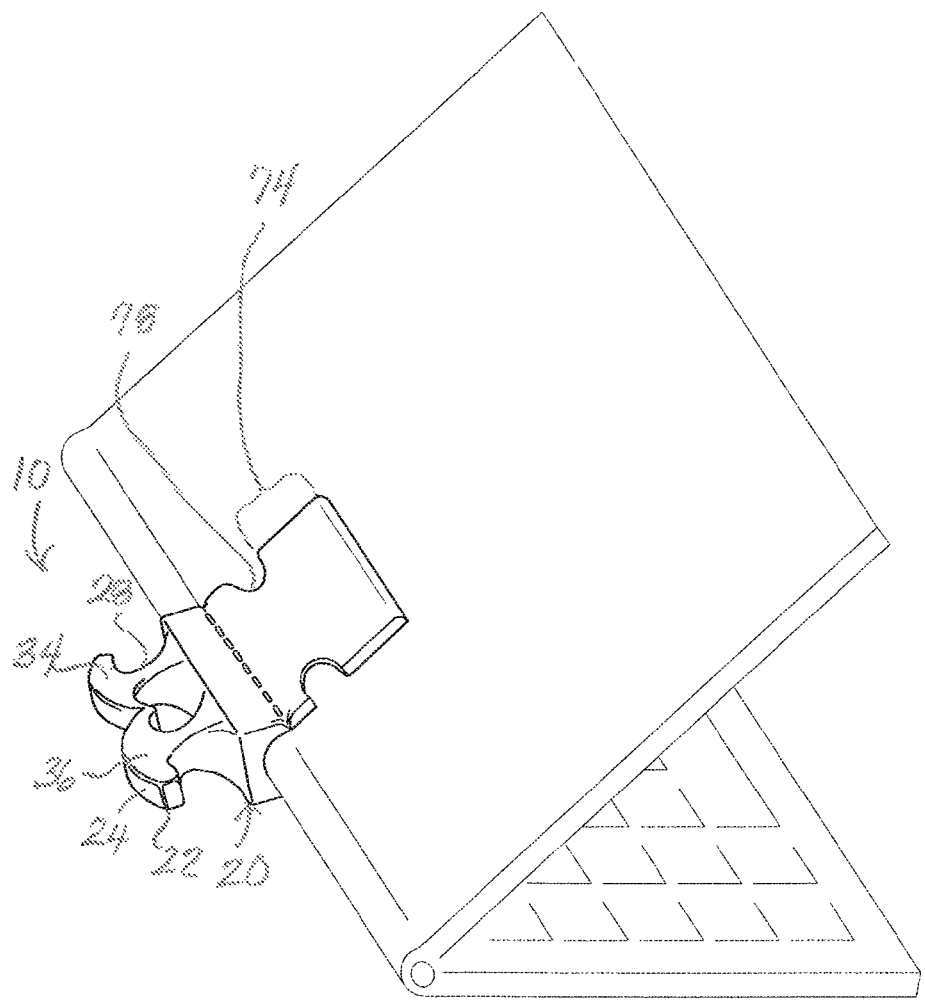
Figure 6:
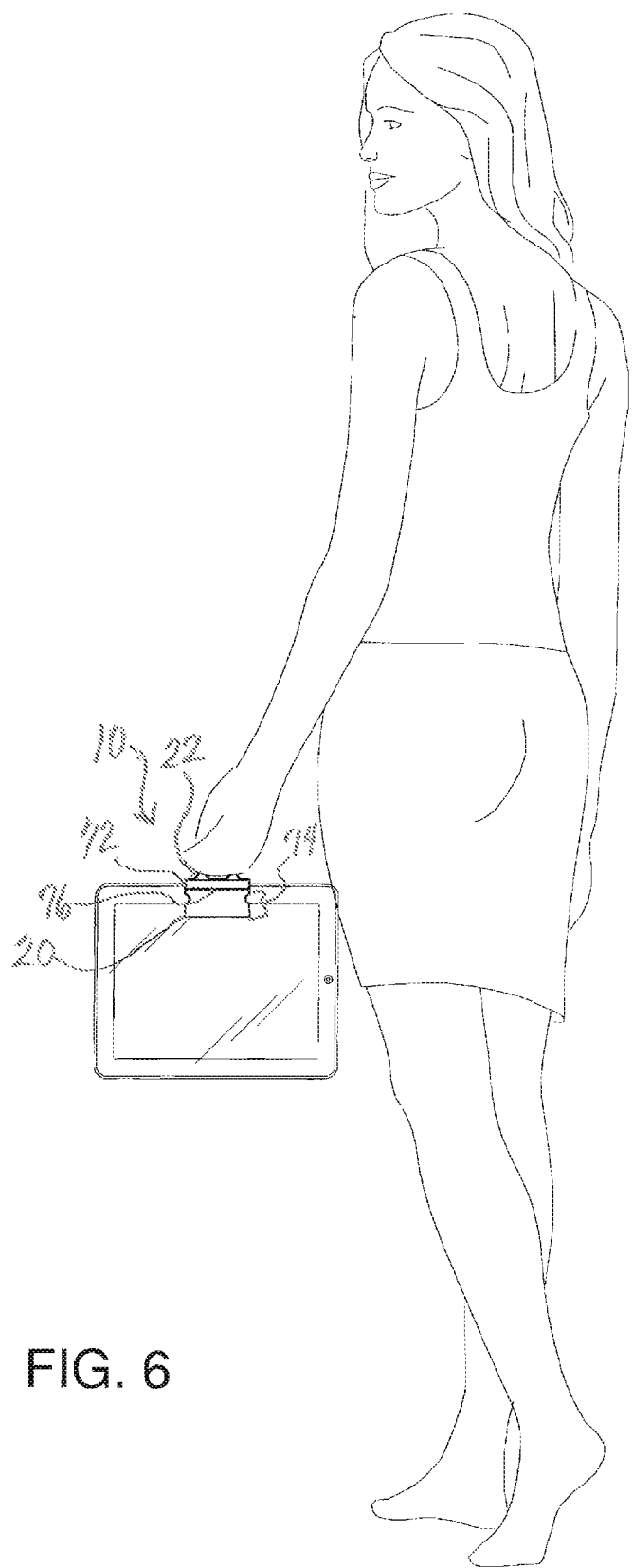

FIG. 1 is an isometric view.
FIG. 2 is a side elevation view.
FIG. 3 is a front elevation view.
FIG. 4 is an in-use view showing a plurality of devices attached an electronic device such as an Ipad.
FIG. 5 is an in-use view showing one device attached to a laptop computer.
FIG. 6 is an in-use view showing one device being used to carry an Ipad.

DETAILED DESCRIPTION OF THE DRAWINGS

With reference now to the drawings, and in particular FIGS. 1 through 6 thereof, an example of the instant carrying device for an electronic device employing the principles and concepts of the present carrying device for an electronic device and generally designated by the reference number 10 will be described.

Referring to FIGS. 1 through 6 the present carrying device for an electronic device 10 is illustrated. The carrying device for an electronic device 10 includes a unitary body 20. The unitary body 20 includes an ergonomic handle 22 and a base 50. The handle 22 has a top side 24, a right side 26, a left side 28, a bottom side 30, and an aperture 32 centrally disposed in the handle 22. The top side 24 includes a first convex portion 34 and a second convex portion 36 conjoined to the first convex portion 34. The aperture 32, configured to receive at least one of a user's fingers therethrough, has an upper edge 38. The upper edge 38 has at least two concave arches 40 and a protrusion 42 disposed between each of the arches 40. A concave opening 44, configured to receive a user's finger therethrough, is disposed in each of the right and left sides 26, 28 of the handle 22. Each opening 44 has a closed apex 46 disposed proximal the aperture 32 with an open outside end 48 disposed on the respective right and left sides 26, 28.

A base 50 is disposed on the bottom side 30 of the handle 22. The base 50 has a first flange 52 having a top edge 54, a bottom edge 56, a right edge 58, a left edge 60, an outer wall 62, and an inner wall 64. The base 50 also has a second flange 66 identical to the first flange 52.

A channel 68, configured to releasably receive an outer edge of an electronic device, is continuously disposed between the inner wall 64 of each of the first flange 52 and the second flange 66.

A fastener member 70, configured to adhere to the front side and the back side of the electronic device proximal the outer edge secured within the channel 68, is disposed on the inner wall 64 of each of the first flange 52 and the second flange 66.

Each of the first and second flanges 52, 66 has an upper portion 72 and a lower portion 74. The lower portion 74 is pivotably attached to the upper portion 72. A folding score line 76 continuously disposed between the upper and lower portions 72, 74 of each of the first and second flanges 52, 66 pivotally attaches the upper and lower portions 72, 74. The folding score line 76 is configured to permit at least one of the lower portions 74 to move from a first position to a second position. The lower portions 74 of the first and second flanges 52, 66 are parallel to each other in the first position and alternately perpendicular to each other in the second position. A concave notch 78 is disposed on each of the right and left edges 58, 60 of each lower portion 74.

What is claimed is:

1. A carrying device configured to carry an electronic device, the carrying device comprising:
    a unitary body comprising:
        a handle having a top side, a right side, a left side, a bottom side, and an aperture centrally disposed in the handle;
        a base disposed on the bottom side of the handle, the base comprising:
            a first flange having a top edge, a bottom edge, a right edge, a left edge, an outer wall, and an inner wall;
            a second flange identical to the first flange;
            a channel continuously disposed between the inner wall of each of the first flange and the second flange; and
            a fastener member disposed on the inner wall of each of the first flange and the second flange;
    wherein the channel is configured to releasably receive an outer edge of an electronic device;
    wherein the fastener member is configured to adhere to the front side and the back side of the electronic device proximal the outer edge secured within the channel;
    wherein the aperture is configured to receive at least one of a user's fingers therethrough;
    an upper portion of each of the first and second flanges; and
    a lower portion of each of the first and second flanges, the lower portion pivotably attached to the upper portion;
    wherein the fastener member is disposed solely on the lower portion; and
    wherein the pivotable attachment of the lower portion to the upper portion is configured to permit one of the lower portions to move from a first position to a second position, wherein the lower portions of the first and second flanges are parallel to each other in the first position, wherein the lower portions are perpendicular to each other in the second position.

2. The carrying device of claim 1 further comprising:
    a folding score line continuously disposed between the upper portion and the lower portion of each of the first and second flanges.

3. The carrying device of claim 2 further comprising:
    an opening in each of the right and left sides of the handle;
    wherein each opening is configured to receive a user's finger therethrough.

4. The carrying device of claim 3 wherein the opening is concave;
    further wherein the opening comprises:
        a closed apex disposed proximal the aperture; and
        an open outside end disposed on the respective right and left sides.

5. The carrying device of claim 4 further comprising an upper edge of the aperture, the upper edge comprising:
    at least two concave arches; and
    a protrusion disposed between each of the arches.

6. The carrying device of claim 5 further comprising a notch disposed on each of the right and left edge of each lower portion.

7. The carrying device of claim 6 wherein each notch is concave.

8. A carrying device configured to carry an electronic device, the carrying device comprising:
    a unitary body comprising:
        an ergonomic handle having a top side, a right side, a left side, a bottom side, and an aperture centrally disposed in the handle, wherein the top side comprises a first convex portion and a second convex portion conjoined to the first convex portion, the aperture having an upper edge, wherein the upper edge comprises at least two concave arches; and a protrusion disposed between each of the arches;
        a concave opening in each of the right and left sides of the handle, each opening comprising:
            a closed apex disposed proximal the aperture;
            an open outside end disposed on the respective right and left sides;
        a base disposed on the bottom side of the handle, the base comprising:
            a first flange having a top edge, a bottom edge, a right edge, a left edge, an outer wall, and an inner wall;
            a second flange identical to the first flange;
            a channel continuously disposed between the inner wall of each of the first flange and the second flange; and
            a fastener member disposed on the inner wall of each of the first flange and the second flange;
    wherein the channel is configured to releasably receive an outer edge of an electronic device;
    wherein the fastener member is configured to adhere to the front side and the back side of the electronic device proximal the outer edge secured within the channel;
    wherein the aperture is configured to receive at least one of a user's fingers therethrough;
    an upper portion of each of the first and second flanges;
    a lower portion of each of the first and second flanges, the lower portion pivotably attached to the upper portion;
    a folding score line continuously disposed between the upper portion and the lower portion of each of the first and second flanges;
    a concave notch disposed on each of the right and left edge of each lower portion;
    wherein the fastener member is disposed solely on the lower portion;
    wherein the pivotable attachment of the lower portion to the upper portion is configured to permit one of the lower portions to move from a first position to a second position, wherein the lower portions of the first and second flanges are parallel to each other in the first position, wherein the lower portions are perpendicular to each other in the second position;

wherein each opening is configured to receive a user's finger therethrough.

9. The carrying device of claim 8 wherein the fastener member is an adhesive.

\* \* \* \* \*